3,525,627
WHEY COMPOSITION FOR MAKING YEAST-RAISED DOUGH PRODUCTS
Andrew D. Singleton, Northfield, Ill., and Ingmar B. Eggen, Fulton, N.Y., assignors to Kraftco Corporation, New York, N.Y., a corporation of Delaware
No Drawing. Continuation-in-part of application Ser. No. 473,214, July 19, 1965. This application Mar. 6, 1969, Ser. No. 805,013
Int. Cl. A21d 2/00
U.S. Cl. 99—91          5 Claims

ABSTRACT OF THE DISCLOSURE

A dough constituent is provided for use in yeast-leavened dough products. The dough constituent includes whey solids, buffering and fortifying salts and minerals, a hydrophilic agent comprising corn flour and a water absorbing agent comprising soy flour.

---

The present invention is a continuation-in-part of application Ser. No. 473,214, filed July 19, 1965, now U.S. Pat. 3,445,238.

The present invention relates generally to an improved whey product and, more particularly, it relates to an improved whey product which is particularly adapted for use in the manufacture of yeast leavened dough products.

The use of non-fat milk solids as a component of yeast leavened dough, such as bread dough is, of course, well known. The provision of non-fat milk solids in bread dough improves the water absorption capability and the handling characteristics of the dough. Such improved absorption and handling characteristics are desirable in commercial breadmaking operations. However, non-fat milk solids are relatively expensive and it has long been the goal of those skilled in the baking art to find a satisfactory substitute for non-fat milk solids.

Much effort has been directed at attempts to use whey as a substitute for non-fat milk solids in the manufacture of bread, since great quantities of whey are obtained as a by-product in the manufacture of cheese. Generally speaking, the use of unmodified, natural whey obtained from a cheesemaking operation as a component in yeast leavened dough is unsatisfactory. The use of unprocessed whey produces bread dough having poor moisture absorption and poor handling characteristics, and the bread produced from such dough is generally characterized as having poor texture, poor grain or crumb, poor moisture retention properties and a reduced volume for the quantity of ingredients employed.

Numerous efforts have been directed to improving the physical properties of whey and the suitability of whey for use in bread doughs. For example, it is known to heat whey under particular conditions so as to de-nature at least a part of the protein of whey. The de-natured protein is insoluble and precipitates from the whey, and imparts a thickened consistency to the whey. The thickened consistency provides a whey with improved physical properties for use in dough products. It is also known to treat whey with various chemical compounds so as to alter the salt balance and pH characteristics of whey. Such treatment with various salts also improves the physical properties of whey for use in bread doughs. A particular whey composition which provides substantially the same properties as non-fat milk solids is the subject matter of U.S. Letters Pat. No. 3,061,442, owned by the assignee of the present application. Such other milk-derived materials have frequently been used in combination with a hydrophilic agent which will provide the desired handleability of the dough in commercial bread baking operations.

It is the primary object of the present invention to provide an improved whey product for use as a constituent of yeast-fermented dough.

It is a further object of the present invention to provide an improved whey product for use as a constituent of yeast-fermented doughs which includes a hydrophilic agent and a water absorbing agent which provides improved handling characteristics. Other objects and advantages of the present invention will become obvious from the following description and claims.

In accordance with the present invention, there is provided a yeast-fermented dough constituent which includes whey solids, buffering and fortifying salts and minerals, a hydrophilic agent comprising corn flour and a water absorbing agent comprising soy flour. The corn flour may be the product commercially available by that name, or it may be a corn flour which has been partially dextrinized and pre-gelatinized. The soy flour may be any commercially available soy flour prepared from defatted soy beans.

More particularly, in accordance with the present invention the whey solids of the dough constituent comprise the serum solids in the whey obtained from cheese making operations, and may also comprise additional amounts of lactalbumin. Lactalbumin is the proteinaceous material which is recovered from whey by heat treatment of the whey, which denatures a portion of its contained protein, followed by separation of the denatured protein from the remainder of the whey by filtratiton or centrifugation. The recovered protein is lactalbumin.

Additional lactalbumin, when used, is provided in the dough constituent at a level of from about 1 percent to about 4 percent, and preferably at a level of about 2 percent to 3 percent.

The whey solids may have been heat treated in accordance with known procedures as to substantially denature the soluble protein contained therein. Such heat treatment is usually effected at temperatures of from about 190° F. to about 280° F. for a period of from about 15 seconds to about 30 minutes.

The buffering and fortifying minerals and salts of the dough constituents of the present invention comprise harmless edible compounds which provide a dough constituent having a pH in the range of between about 6.5 and 8.5 when the dough constituent is mixed with water to provide a dispersion having 10 percent by weight of the dough constituent. The buffering and fortifying minerals and salts provide a buffering effect in the dough system in which the constituent is used at a pH of between about 5.1 and 5.4. Such buffering and fortifying salts and minerals are in addition to those occurring naturally in the whey solids of the dough constituent.

The buffering and fortifying salts and minerals comprise calcium and phosphate compounds, at levels which provide the desired pH and buffering effects. Generally, the levels of calcium and phosphate compounds are the same as those set forth in U.S. Letters Patent No. 3,061,442, to which reference has previously been made. Thus, calcium compounds are provided at levels such that the whey solids comprise $P_2O_5$ in an amount of more than about 1.0 percent and less than about 2.5 percent.

The dough constituent of the present invention further comprises corn flour at a level of from about 5 percent to about 30 percent, and soy flour at a level of from about 2 percent to about 30 percent. The provision of corn flour and soy flour in the dough constituent is an important feature of the present invention, and provides a whey product with unexpected beneficial results in comparison with whey products heretofore known for use as dough constituents.

In this connection, the combination of corn flour and soy flour provides a whey product for use as a dough constituent with improved properties in comparison with whey products wherein only one of the combination is used in the whey product. There is an apparent synergistic effect between the combination of corn flour and soy flour which provides dough and baked goods prepared with the whey product as a constituent with improved properties in comparison to those attainable when only one of the combination is present in the whey product. For example, it is taught in copending application Ser. No. 473,214 that the handling characteristics of dough prepared with a whey product containing corn flour as a component are better suited for continuous bread manufacture than dough which contains non-fat milk solids as a component. A whey product, in accordance with the present invention, containing a combination of corn flour and soy flour, however, has handling characteristics that are considered even better suited for continuous bread manufacture. In addition, bread which is baked from dough containing a whey product with a combination of corn flour and soy flour has better texture, grain, appearance and taste than does bread baked from a dough containing a whey product wherein only one of the combination is present.

The combination of corn flour and soy flour is present in the whey product at a level of from about 10 percent to about 60 percent. At higher levels dough products which are prepared with the whey product as a component have a tendency to develop an undesirable grain, color and flavor when the whey product is added at effective levels to the dough product. At lower levels the improved features of the invention are not attained.

The soy flour is present in the whey product at a ratio to the corn flour of from about 1:3 to about 1:1. At higher ratios an undesirable taste may be contributed by the soy flour. At lower levels the synergistic effect of the combination of corn flour and soy flour is not noted.

The corn flour may comprise a flour made from corn which has been cleaned to remove extraneous materials, and which preferably has been subjected to electrostatic treatment for ridding it of such materials. The cleaned corn is then washed with water, and is thereafter processed to remove a portion of the hull and of the germ of the corn kernel. The resultant corn material is therefore ground to provide a ground corn material of various particle sizes. The corn flour of the present invention is that fraction of the ground corn having a particle size of less than 50 mesh (U.S. standard sieve). The corn flour has the following analysis:

| Ingredient: | Percent by weight |
| --- | --- |
| Protein | 7.3–8.5 |
| Fat | 1.7–3.0 |
| Fibre | 0.7–1.1 |
| Ash | 0.5–8.8 |
| Moisture | 8.0–11.5 |

Alternatively, the corn flour of the present invention may comprise a flour made in accordance with the foregoing procedure but which has also been subjected to dry heating to effect partial dextrinization and to heating under moist conditions to effect partial gelatinization of its contained starch.

In a preferred embodiment of the present invention the corn flour in the whey product is at least about 25 percent corn flour which has been partially dextrinized and gelatinized.

The soy flour may be selected from any soy flour which has been prepared from defatted soy beans. The soy flour of the invention has a particle size of less than 60 mesh (U.S. Standard Sieve). The soy flour has the following analysis:

| Ingredient: | Percent by weight |
| --- | --- |
| Protein | 40–60 |
| Fat | 0.5–3.0 |
| Carbohydrates | 0.8–4.0 |
| Ash | 1.5–7.0 |
| Moisture | 2.0–8.5 |

EXAMPLE

As an example of the practice of the present invention, whey obtained from the manufacture of Cheddar cheese is concentrated by vacuum evaporation to a solids content of about 50 percent. To such whey concentrate is added calcium oxide (CaO) at a level sufficient to increase the pH of the whey concentrate to about 6.5.

Corn flour, having an analysis within the range set forth in the preceding table, and lactalbumin are separately dispersed in cold water to provide a first dispersion. In this connection, the water temperature should be maintained below about 140° F. in order to avoid difficulty in subsequent processing. The dispersion is added to the foregoing whey concentrate.

Thereafter, calcium chloride ($CaCl_2 \cdot 2H_2O$), dicalcium phosphate ($CaHPO_4 \cdot 2H_2O$) and an additional amount of calcium oxide are also dispersed in water, and this dispersion is added to the mixture of whey concentrate and the first dispersion. The resultant mixture has a pH of 8.0–8.4.

The resultant mixture is thereafter spray dried, and the dry material provides a mixture comprising the following:

| Ingredient: | Percent by weight |
| --- | --- |
| Whey solids | 84.7 |
| Lactalbumin | 2.0 |
| Calcium chloride | 1.1 |
| Dicalcium phosphate | 1.3 |
| Calcium oxide | .9 |
| Corn flour | 10.0 |

Soy flour, having an analysis within the range set forth in the preceding table, and partially dextrinized and gelatinized corn flour are then added to the dried mixture to provide a dough constituent having 20 percent soy flour and 26 percent corn flour. The dough constituent has a pH of about 7.2.

The dough constituent is utilized to make bread by the conventional sponge method. A sponge is prepared by placing 500 grams of water in a mixing bowl, to which is added 840 grams of flour. Thirty grams of baker's yeast and three grams of yeast food are also added.

A dough mix is prepared comprising the following:

| Ingredient: | Weight, grams |
| --- | --- |
| Water | 328 |
| Flour | 360 |
| Sucrose | 48 |
| Shortening | 48 |
| Salt | 18 |
| Dough constituent | 48 |

The sponge and the dough mix are combined, and a dough is prepared in accordance with conventional procedures, and subsequently is baked.

Bread made from such dough is then compared with a control bread which is identically prepared except that non-fat milk solids is used in the dough mix instead of the dough constituent of the present invention. The bread made utilizing the dough mix comprising the dough constituent of the present invention is equivalent to the control bread.

Bread made from dough comprising the whey product of the present invention is also compared to bread which is identically prepared except that the whey product of U.S. Letters Patent No. 3,061,442 is used in the dough mix. The bread comprising the dough constituent of the present invention has substantially improved grain and crumb color, and is otherwise equivalent to that made in accordance with that patent.

Bread made from dough comprising the whey product of the invention is also compared to bread which is identically prepared except the dough constituent does not contain soy flour. The dough comprising the dough constituent with the soy flour has improved handling characteristics. Bread baked from the dough comprising the dough constituent with soy flour has equivalent texture, grain and crumb color and is otherwise equivalent to that made with the dough constituent without soy flour.

Thus, there has been provided an improved whey product for use as a constituent in yeast-fermented dough. The improved whey product comprises a hydrophilic agent and soy flour which provides improved dough handling and water absorption characteristics and which is fully comparable to results obtained utilizing non-fat milk solids.

Various of the features of the present invention are set forth in the following claims.

What is claimed is:

1. An improved whey product for use as a constituent in yeast-fermented dough products comprising, in combination, whey solids, buffering and fortifying salts and minerals, a hydrophilic agent, and soy flour, said buffering and fortifying salts and minerals comprising harmless edible calcium and phosphorous compounds, said whey product having a pH in the range of between about 7.0 and 8.0, said hydrophilic agent comprising corn flour at a level of from about 5 percent to about 30 percent by weight of said whey product, said soy flour being present at a level of from about 2 percent to about 20 percent by weight, said soy flour being present at a ratio to said corn flour of from about 1:3 to about 1:1.

2. An improved whey product in accordance with claim 1 wherein at least about 25 percent by weight of said corn flour has been partially dextrinized and gelatinized.

3. An improved whey product in accordance with claim 1 wherein said whey solids include additional lactalbumin in an amount sufficient to provide a level of lactalbumin in said whey product of from about 1 percent to about 4 percent by weight above the level of lactalbumin supplied by the whey solids.

4. An improved whey product in accordance with claim 1 wherein said corn flour has a particle size of less than about 50 mesh and said soy flour has a particle size of less than about 60 mesh.

5. An improved whey product in accordance with claim 1 wherein the total level of said corn flour and said soy flour does not exceed about 50 percent by weight of said whey product.

References Cited

UNITED STATES PATENTS 2,602,746 7/1952 Meade _____ 99—56
3,061,442 10/1962 Ward et al. _____ 99—91

OTHER REFERENCES

Matz, S.A.: Bakery Technology and Engineering, The AVI Pub. Co., Inc., Westport, Conn., 1960, p. 20.

RAYMOND N. JONES, Primary Examiner

U.S. Cl. X.R.

99—57